(12) United States Patent
Niblett et al.

(10) Patent No.: US 6,336,135 B1
(45) Date of Patent: Jan. 1, 2002

(54) GATEWAY FOR CONVERTING SYNCHRONOUS CLIENT/SERVER PROTOCOLS INTO ASYNCHRONOUS MESSAGING PROTOCOLS AND STORING SESSION STATE INFORMATION AT THE CLIENT

(75) Inventors: Peter David Niblett, Whitchurch; Karen Louise Randell, Eastleigh, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/180,986
(22) PCT Filed: May 19, 1997
(86) PCT No.: PCT/GB97/01384
  § 371 Date: Nov. 19, 1998
  § 102(e) Date: Nov. 19, 1998
(87) PCT Pub. No.: WO97/45798
  PCT Pub. Date: Dec. 4, 1997

(30) Foreign Application Priority Data

May 24, 1996 (GB) .............................................. 9610898

(51) Int. Cl.[7] ........................ G06F 15/16; G06F 15/163; G06F 9/46
(52) U.S. Cl. ........................ 709/215; 709/227; 709/314
(58) Field of Search ................................. 709/101, 201, 709/202, 213–215, 227–228, 249, 313–314; 714/15, 18

(56) References Cited

U.S. PATENT DOCUMENTS

| | | | | |
|---|---|---|---|---|
| 5,329,619 A | * | 7/1994 | Page et al. | 709/203 |
| 5,465,328 A | * | 11/1995 | Dievendorff et al. | 714/15 |
| 5,687,373 A | * | 11/1997 | Holmes et al. | 709/238 |
| 5,754,772 A | * | 5/1998 | Leaf | 709/203 |
| 5,835,724 A | * | 11/1998 | Smith | 709/227 |

(List continued on next page.)

FOREIGN PATENT DOCUMENTS

| | | |
|---|---|---|
| WO | 9527357 | 10/1995 |
| WO | 9745798 | 12/1995 |

OTHER PUBLICATIONS

Perrochon, L., et al., "IDLE: Unified W3–access to Interactive Information Servers," Comp. Networks & ISDN Systems, vol. 27, No. 6, pp. 927–938, Apr. 1995.*

Perrochon, L., "Translation Servers: Gateways Between Stateless and Stateful Information Systems," ftp://ftp.inf.ethz.ch/doc/papers/is/ea/nsc94.ps, pp. 1–8, 1994.*

Perrochon, L., "Multiple Service Integration Confronted with Legacy Systems," ftp://ftp.inf.ethz.ch/doc/papers/is/ea/www94.ps, pp. 1–6, 1994.*

(List continued on next page.)

Primary Examiner—Zarni Maung
Assistant Examiner—Andrew Caldwell
(74) Attorney, Agent, or Firm—Jerry W. Herndon

(57) ABSTRACT

Provided is a gateway for linking between different communication models. The gateway, which may be implemented in a computer program installable on a server system, facilitates interoperation between computer programs which require synchronous communications sessions and computer programs based on an asynchronous model of communication. The invention enables a synchronously-connected client to revisit interactions with a server and asynchronously communicating programs, to interleave interactions with more than one application, and to associate together request-response pairs of a long running application. In particular, the invention provides apparatus and methods enabling linking between the Internet WWW service and a general purpose messaging system.

18 Claims, 3 Drawing Sheets

U.S. PATENT DOCUMENTS

| | | | | |
|---|---|---|---|---|
| 5,961,601 A | * | 10/1999 | Iyengar | 709/229 |
| 6,003,085 A | * | 12/1999 | Ratner et al. | 709/227 |
| 6,012,094 A | * | 1/2000 | Leymann et al. | 709/230 |
| 6,023,722 A | * | 2/2000 | Colyer | 709/201 |
| 6,055,564 A | * | 4/2000 | Phaal | 709/207 |
| 6,068,661 A | * | 5/2000 | Shari | 703/27 |
| 6,070,197 A | * | 5/2000 | Cobb et al. | 709/303 |
| 6,085,247 A | * | 7/2000 | Parsons, Jr. et al. | 709/227 |
| 6,088,728 A | * | 7/2000 | Bellemore et al. | 709/227 |
| 6,108,689 A | * | 8/2000 | Fagen et al. | 709/206 |
| 6,134,592 A | * | 10/2000 | Montulli | 709/229 |
| 6,216,151 B1 | * | 4/2001 | Antoun | 709/203 |

OTHER PUBLICATIONS

Perrochon, L., Index to papers, ftp://ftp.inf.ethz.ch/doc/papers/is/ea/index.long, pp. 1–6, Jan. 2001.*

"Persistent Context for World Wide Web Browsers" IBM Technical Disclosure Bull. vol. 40, No. 2, Feb. 1, 1997.

Tak Woon Yan, Matthew Jacobsen, Hector Garcia–Molina, Umeshwar Dayal: "From user access patterns to Dynamic Hypertext Linking". Computer Networks & ISDN Systems, vol. 28, May 1, 1996, pp. 1007–1014.

Jim Reid: "Plugging the Holes in Host–based Authentication" Computers & Security, vol. 15, No. 8, May 1, 1996, pp. 661–671. See abstract, see paragraph 3.2.

Jones K L: "NIF–T–NAV: A Hierachical Navigator for WWW Pages" Computer Networks and ISDN Systems, vol. 28, No. 7/11, May 1, 1996, pp. 1345–1353.

* cited by examiner

GATEWAY FOR CONVERTING SYNCHRONOUS CLIENT/SERVER PROTOCOLS INTO ASYNCHRONOUS MESSAGING PROTOCOLS AND STORING SESSION STATE INFORMATION AT THE CLIENT

FIELD OF INVENTION

The present invention relates to linking together data communications and/or data processing resources in a network, and in particular to providing links between different communications environments.

BACKGROUND OF THE INVENTION

A 'network' of computers can be any number of computers that are able to exchange information with one another. The computers may be arranged in any configuration and may be located in the same room or in different countries, so long as there is some way to connect them together (for example, by telephone lines or other communication systems) so they can exchange information. Just as computers may be connected together to make up a network, networks may also be connected together through tools known as bridges and gateways. These tools allow a computer in one network to exchange information with a computer in another network. The Internet is a network of networks having no single owner or controller and including large and small, public and private networks, and in which any connected computer running Internet Protocol software is, subject to security controls, capable of exchanging information with any other computer which is also connected to the Internet. This composite collection of networks which have agreed to connect to one another relies on no single transmission medium (for example, bidirectional communication can occur via satellite links, fiberoptic trunk lines, telephone lines, cable TV wires and local radio links).

The World Wide Web (WWW) Internet service is a wide area information retrieval facility which provides access to an enormous quantity of network-accessible information and which can provide low cost communications between Internet-connected computers. Information about the World Wide Web can be found in "Spinning the Web" by Andrew Ford (International Thomson Publishing, London 1995) and "The World Wide Web Unleashed" by John December and Neil Randall (SAMS Publishing, Indianapolis 1994). Use of the WWW is growing at an explosive rate because of its combination of flexibility, portability and ease-of-use, coupled with interactive multimedia presentation capabilities. The WWW allows any computer connected to the Internet and having the appropriate software and hardware configuration to retrieve any document that has been made available anywhere on the Internet. The retrievable documents on the WWW include 'HyperMedia' documents—i.e. documents which may be text documents or other forms of media such as sounds and images and which have links ('hyperlinks') to other documents. The format of text documents on the WWW is a standard format in HTML (HyperText Markup Language), such that a document created on one operating system and hardware platform can be read by a user on any other platform that has a Web Browser (see below). Images may be stored in separate graphics files, for example in standard GIF or JPEG format, and referenced in the HTML text such that the user is prompted to retrieve the specified image files as well as the HTML text.

Users access this information using a 'Web Browser', or 'Web client', which is software installed on the user's computer and having facilities for serving or retrieving documents from a Web Server via the Internet. Currently available Web Browsers include WebExplorer from IBM Corporation and Mosaic from NCSA. Such Browsers include directories and search tools and understand HTML and other WWW standard formats and can display or output files correctly in these formats. The user interface of these Web Browsers is a graphical 'point-and-click' interface (i.e. items can be selected by moving a cursor across a graphical display and then pressing a mouse button). The WWW is structured as pages or files which each have a particular Universal Resource Locator (or URL). The URL denotes both the server machine and the particular file or page on that machine. The user can either specify a particular URL or jump from one URL to an associated URL by means of the 'hyperlinks'—that is, a word or symbol on a page can be associated with another URL which is selectable, for example by clicking a mouse at the relevant location, to cause the Browser to retrieve and display the relevant page. There may be many pages resident on a single server, and associated hyperlinked pages may be located on different servers. If a URL begins "http:" then this indicates that the file contains hyperlinks.

When a user selects a URL for a page on a Web server system using his Web Browser, a one-shot request is sent to the relevant server which performs an action specific to that page. In many cases the server responds to the request by retrieving the requested page from a database of stored pages and transmitting the HTML page back over the Internet to the WWW client for display to the user. This is performed within the scope of a single end-to-end synchronous communication session. That is, the Browser sends its request and then waits for a response before proceeding with any further processing or initiating other requests. The Browser is said to be 'blocked' or 'suspended' while it waits for the requested response. In some cases the Browser's request will lead to the server launching an application to generate the HTML, but again the one-shot request from the Browser requires a response within the scope of the present synchronous communication session since the Browser does not provide for concurrent communication sessions and no application state information is maintained between requests. A failure to access a page requested by a Browser can be signalled back to the user by means of an error message displayed on the user's terminal, but if the server is merely slow to respond then the Browser remains suspended for an indefinite period. In practice, a user may abandon the communication attempt if the delay is unacceptable to them. There is no facility within Web Browsers for automatic retry of a request.

Modern enterprises require facilities for communication with other departments within the enterprise and with associated enterprises such as customers or suppliers, who may be in a different country. The WWW Internet service can provide a partial answer to such a requirement, providing a cost effective communication medium for inter-company communications, but the WWW Internet service's one-shot request-response communication model and the lack of provision for parallel requests from a Browser can represent severe limitations if requested information is not available within an acceptable time period. It is often unacceptable for a sender system to be suspended indefinitely and it is unacceptable for the success of business-critical applications to be dependent on whether a server application responds to a request in time. The WWW Internet service does not provide facilities for assured delivery of messages which is a requirement of many business critical applications (that is, the application needs to know that a message it has sent will not be lost on its way to the target destination, and that it will only be sent once). Also, business applications may involve a conversation taking up many request-response pairs and the lack of any context information being carried over between Web Browser requests means that there is no facility for relating together requests which are part of the same business application.

An alternative communication model to the synchronous, time-dependent 'request and await response' model is asynchronous messaging. A program which sends a message to a receiver program need not be blocked to await a reply from the receiver and so can continue executing, and the sender and receiver are not synchronised (serialised) with one another. Asynchronous inter-program messaging typically uses message queues as intermediate storage facilities into which messages are placed when sent from a first program and from which they can be retrieved by a receiver program when it is ready. There is no dedicated logical connection between the programs. After placing a message in a queue, the sender program can proceed to execute other tasks which may involve sending messages to other programs in the network. It is known in the art to provide asynchronous messaging systems which support inter-program communication across heterogeneous networks, and which shield application programs (which are each written for a particular operating system environment) from the complexities of the network and from the work of maintaining and locating message queues. Such messaging systems are important to many commercial enterprises who need to achieve effective interoperation between their various business application programs but whose data processing resources comprise a range of disparate operating system and hardware environments.

Message queuing and commercially available message queuing products are described in "Messaging and Queuing Using the MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). IBM and MQSeries are trademarks of IBM Corporation. IBM's MQSeries messaging software products provide transactional messaging support, synchronising messages within logical units of work in accordance with a messaging protocol which gives assured once and once-only message delivery even in the event of system or communications failures. MQSeries products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure. This message transmission protocol and the associated transactional concepts and recovery facilities are described in international patent application WO 95/10805 and U.S. Pat. No. 5,465,328, which are incorporated herein by reference.

It is desired to bring the benefits of asynchronous (off-line) processing to computing resources which are adapted for synchronous communication, such as client systems of the WWW Internet Service, and generally to enable inter-operation between resources based on an asynchronous model of communications and resources based on a synchronous model, preferably without requiring major changes to the existing synchronous resources. It is also desired to facilitate tracking of the progress of asynchronous messages from a synchronously connected client system.

In addition to linking their computing resources into the Internet, companies are also finding that Internet standards (the Internet Protocol, use of HTML, etc) are advantageously implemented within an 'intranet'—that is, within a network of computers within a particular enterprise which network adheres to the standards of the Internet. Browser software is now available for use within intranets.

The above requirements exemplify the requirement of many users of data processing resources for interoperability between their different resources regardless of whether they are adapted for different environments or based on different communication models or architectures. Application programs written for different operating systems or based on different communications models or paradigms, and computers and other communicating systems using different communication protocols, data formats, languages, or modes of communication are increasingly required to interoperate seamlessly and without end user knowledge of the complexities of the interaction. The present invention serves to address certain apparent inherent incompatibilities between resources for which interoperation is desired, providing a link between the different resources.

SUMMARY OF THE INVENTION

According to a first aspect of the invention there is provided a data communications server system of a communications network, wherein the server system has facilities for supporting synchronous communication between the server system and a client system of the network and wherein the server system also has facilities for supporting asynchronous communication with programs (such as application programs) on the server system or on another system of the network, said server system including:

means, responsive to a request from said client system within a synchronous communication session between the client system and the server system, for sending a request (which is related to the client request) to a program on the server system or on another system of the network as an asynchronous communication;

means, responsive to receipt of a reply to said asynchronous communication, for associating said reply with said request from the client system to enable a reply to be sent to the client system;

means for generating a preliminary reply before receipt of a reply to said asynchronous communication; and means for sending at least a preliminary reply to said client system within said synchronous communication session.

Thus, a system according to the present invention has means for sending at least a preliminary reply to the client within the synchonous communication session, even if no reply to the asynchronous request has yet been received.

A second aspect of the invention provides a method of inter-program communication between a client program and a program on the server system or another system of the network using the facilities of a server system as described above.

The invention enables a process at the client system to communicate with the asynchronously-communicating program even if the client process requires a dedicated synchronous communication session for inter-program communication. The program on the server system or other system of the network may be an application program adapted to receive and send asynchronous messages with no dedicated communication session. Also, preliminary replies which are sent to the client system within the initial synchronous session provide a means for confirming that the server system has received the request. If the server system is part of a network of servers providing assured delivery of messages between them but the synchronously-connected client system does not support assured delivery for the communication hop between client and connected server, then it can be highly desirable to provide tracking of whether a request has successfully reached the server—that is, tracking communications across the non-assured link of the communications route.

'Preliminary replies' are preferably only sent when a 'full reply' is not available for sending to the client system within a preset time period (e.g., within a time period as defined by a system administrator). That is, if a reply has not yet been received from an asynchronously-communicating application program when the preset time period expires such that the server is not yet able to provide the requested full reply, then a process at the server system is triggered to send a preliminary reply to the client system. The preliminary reply preferably includes a session identifier assigned by the server system and unique within the server system.

Inclusion of the session identifier in preliminary replies to a client system enables the client system (or an end user working at the client system), which did not receive an expected full reply from an application program or other asynchronously-communicating program before a timeout, to contact the server again later on and, using the session identifier, to determine whether a response associated with that session identifier is yet available. The client which has received a preliminary reply is thus able to proceed with other processing tasks and then to revisit the interaction with the server at some later time, using the session identifier. This avoids the problem, which otherwise arises, that a synchronously connected client process must either remain blocked (for an indeterminate period of time) to wait for a response or abandon the application if a response is not available sufficiently quickly.

According to a preferred embodiment of the invention, communications sent to a client system in response to expiry of the timer facilitate a decision by a process or user at the client system as to whether a synchronously-connected process at the client system should remain suspended (i.e. maintaining the current session) or the session should be abandoned. If the session is abandoned, the client process may revisit earlier interactions by means of the session identifier; the identifier which was sent to the client system may be included in a subsequent request sent to the server system such that the server is able to identify any available responses to earlier requests which had the same session identifier. Thus, after a timeout a client which requires dedicated communication sessions is enabled to decide whether to maintain its synchronous connection to the server or to change to what is in effect asynchronous communication with the server using associated synchronous sessions, or simply to abandon the communication for good. The client is thus provided with options other than those of remaining suspended indefinitely or abandoning the application.

As well as enabling a client to revisit earlier interactions, providing a client with a session identifier for a particular interaction facilitates the client associating together a number of request-reply pairs of a conversation, even if the communicating process at the client system is based on a one-shot request-reply model. It also helps to address the problem of possible failure of the link between client and server while the client awaits a reply. It also allows a client process or user to interleave interactions with several different applications by providing a means to distinguish between them, and enables more than one user to access the same application at the same time. Session identifiers may be automatically stored by the client system on receipt of a preliminary reply, for subsequent use as described above.

The terms 'client' and 'server' are used above merely to distinguish between the roles fulfilled in a particular interaction—i.e. the client issues a request and the server takes action in response to the request. Any computer which performs a task at the request of another computer is a server. The term 'client-server' is often used in the data processing field to refer to an environment in which a client (e.g. a workstation) only provides functions for end-user interaction while a server (e.g. a mainframe computer) provides data storage and access and performs complex processing. The present invention is applicable to such 'client-server' environments and also to 'peer-to-peer' environments in which there is no such distinction between the functions provided by the communicating systems. The invention is particularly valuable in situations in which a computer program on a first system is specifically adapted for synchronous communication and it is desired for the program to communicate with an application program adapted for asynchronous inter-program communication which is running on a different system, such as where it is desired for a Web Browser to interoperate with an asynchronous application program via a message queuing system.

According to a preferred embodiment of the invention, if the server receives a reply to its asynchronous request before expiry of the preset time period, then it will include information from the received reply within its reply to the client system which it sends within the synchronous session. Thus, the asynchronous nature of the communication with the application program can be made invisible to the client if a reply from the application program is available sufficiently quickly, with the client then being sent a full reply within the synchronous session.

An alternative embodiment of the invention avoids blocking of a client process by returning to the client system a preliminary confirmation of receipt of the client request without waiting for a timer expiry. The confirmation of receipt includes a session identifier (for example, a unique reference number) assigned by a process at the server system. In this case, the client may proceed with other tasks as soon as it has received its confirmation without being suspended to await a full reply or expiry of a timer. When a reply is subsequently received from the application program it is placed in storage at the server and held until such time as the client sends a further communication to the server which references the assigned session identifier. The server matches the session identifier of the stored reply and the new request and then sends the stored reply to the client.

It is also within the scope of the present invention to make the type of reply to a client request dependent on the nature of the request. Some requests, such as a goods order, may require an immediate confirmation of receipt with an assigned order number which minimises the time for which the client process is suspended. Other requests, such as a bank balance query, may not require a confirmation of receipt of the request in advance of providing the requested information, as such information is often only required if it is available quickly; in such an example it is appropriate for the client to wait for a certain period for a full reply. This determination of whether or not to send an immediate confirmation is preferably implemented by providing an end user with means for indicating a desire for a confirmation, such as by providing an optional field or parameter within a request form, and means for responding to entries in this field.

The session identifiers are preferably associated with requests from a client system by a process at the server system, which embeds the session identifier in the related asynchronous request which it sends to an application program. The asynchronous server request thus includes information from the initial client request and the assigned identifier. When the server system subsequently receives a reply from the application program which reply includes this session identifier, the server associates this reply with the request from the client system and sends to the client system a reply which includes the session identifier. Note here that the server may be assigning a session identifier to an interaction with a client process which does not, of itself, support multiple concurrent sessions. The exchange of a session identifier, and use of a client system's storage facilities to store the session identifiers which are returned to it, enables these identifiers to be used to distinguish between concurrent sessions. The client is enabled to interleave interactions with a plurality of different applications since it has a means for distinguishing between them, and the server is enabled to easily associate replies to asynchronous messages with respective requests. Such provision for concurrent or parallel processing of applications may significantly increase business efficiency.

The invention enables communications resources which are designed for one-shot synchronous communications to interoperate with resources which utilise asynchronous communication.

It is preferred for a system and method according to the invention to support serialising of interactions between a client system and an application program. This may be implemented by means of session state information (such as a sequence number identifying the position of the interaction within the current conversation) which is included in messages from the application program being passed back to the client. An application which requires further input from the client system will indicate this by way of session state information in its replies, this information being identifiable to one or both of the server and client systems. By means of the session identifier and session state information it is possible both to identify associated request-response pairs of a particular application which may involve several successive user interactions and to ensure correct sequential ordering of communications within a session.

Session identifiers are preferably included both in communications which are sent to a client after a timer expiry and in replies which are sent to a client from an application which is expecting further interaction with the client. According to one embodiment, there is a determination at the server system of whether to include session identification information in replies, the determination process preferably being responsive to session state information sent from a communicating application program and responsive to expiry of the timer. If no further input from the client (i.e. from an end user or process at the client system) is expected, then the server system releases any session-specific resources when passing a reply to the client and no session identifier is required.

This determination process may be desirable in view of the potential problems associated with sessions being maintained for a longer period than is necessary. Firstly, maintaining sessions uses server system resources. Secondly, returning identifier information in the last one of a sequence of request-reply interactions could entail the identifier information remaining in storage at the client system indefinitely. This may be a security exposure as well as using client resources. If identifier information is always returned to the client system (i.e. the determination process referred to above is not implemented), then the above-mentioned problems are addressed by deleting the state information from the client system after an appropriate time period.

A preferred embodiment of the invention provides a data communications system in which the server system has Internet World Wide Web (WWW) Server software installed thereon and the client system has WWW Browser software installed thereon for submitting requests to Internet-connected server systems. The server system also has facilities for supporting asynchronous message communication between application programs. When the server system receives HTML requests from said WWW client terminal (within a synchronous communication session) which require interaction with an application program which is designed for asynchronous communications, a process at the server system forwards the request to the application program as a message sent to the application program's input queue. If the application program cannot interpret HTML then the process at the server also converts the received HTML request into a message format recognisable to the application program and then forwards the converted message. Responsive to receiving a reply message from the application program before expiry of a preset time period, the process at the server system converts the reply message back to HTML (if necessary) and sends the created HTML pages as a reply to the client terminal. From the perspective of the WWW client, if the reply is available before expiry of a timeout period then the reply is within the original synchronous communication session.

The server system includes means for embedding session identifier information within the HTML pages which are included in replies sent to said client system. The server system preferably also includes means, responsive to session state information included in the application program's reply to the asynchronous request, for including within the HTML pages one or more HTML forms for completion by an end user, these forms having the session identifier embedded therein. The session state information may also be embedded within the HTML pages.

The server responds to expiry of the time period before receipt of a reply message from the application program by sending a communication (i.e. a page of HTML) to the WWW client terminal. This communication includes a session identifier and preferably an identifier of the session state. The communication sent back to the client ends its synchronous HTTP session, and the WWW client is no longer suspended, but the client's longer running communication 'session' with the gateway is still logically existent in that information is retained which enables revisiting of the interaction between the WWW client and the gateway program. An end user can determine whether or not to re-enter the suspended state for an additional period and start a new synchronous session. The session identifier and state information is stored in cache memory of the WWW client system, using the facility of WWW clients to cache WWW pages. The WWW client can use this cached information to revisit the earlier interaction—to check at some later time whether a reply message from the application program is available at the server. By including the session identifier and session state information in subsequent requests to the server which are associated with the original session, the client enables the server to distinguish between different sessions and between different requests which are part of the same application.

The embodiment of the invention described above provides conversion from HTML to a non-HTML message format in accordance with known techniques. Where the application to be invoked is able to interpret HTML, such conversion is clearly not required.

Thus, the present invention in a preferred embodiment provides a link between the synchronous environment of the WWW and the asynchronous environment of messaging systems. The invention is equally applicable to use of Browser software for communication with application programs via a server system of an intranet.

BRIEF DESCRIPTION OF THE DRAWINGS

The present invention will now be described in more detail, by way of example, with reference to the accompanying drawings in which.

DETAILED DESCRIPTION OF THE PREFERRED EMBODIMENT

The present invention may be implemented within many different data processing systems and communications systems in which links between different environments are required. The invention is not limited to specific computer hardware or operating systems or to specific types of communication links, and may be implemented either in hardware or software or as a combination of hardware and software components.

A preferred embodiment of the present invention includes a software-implemented component of a server system which provides a link between an asynchronous messaging and queueing environment and the synchronous environment of the World Wide Web.

Figure 1:
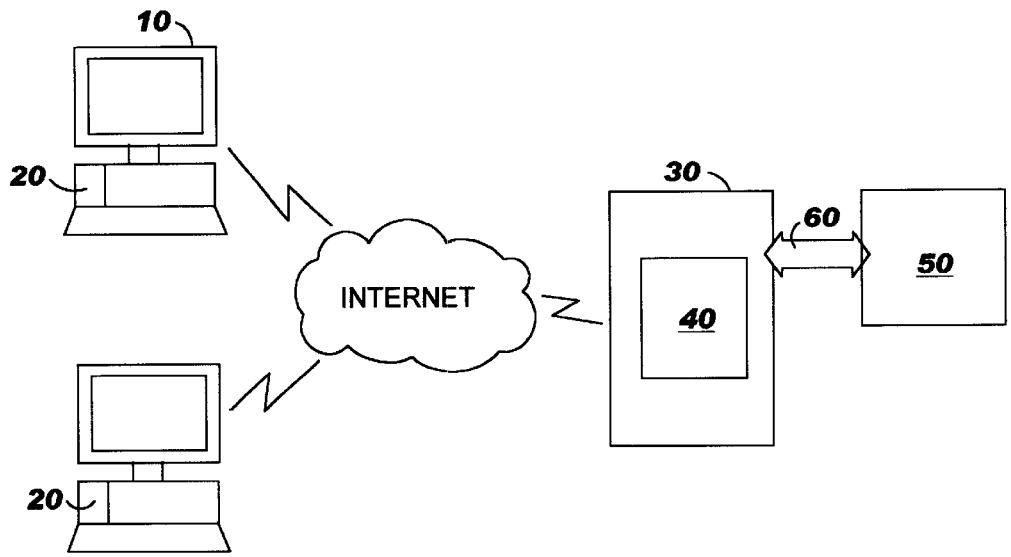
FIG. 1 is a schematic representation of communication between client and server systems across the Internet.

As shown in FIG. 1 and described above, end-users of the Internet are equipped with computers 10 having Internet access and having Web Browser software 20 installed thereon. A Web Server system 30 comprises a computer system (which system may be, for example, running Windows NT operating system software or UNIX operating system software, or may be an IBM PS/2 Model 80 computer running OS/2 operating system software, or a mainframe system supporting IBM's MVS operating system) attached to the Internet and running Web Server software 40 (such as the IBM Internet Connection Server). OS/2, MVS and PS/2 are trademarks of IBM Corporation. The Web Server software services HTTP (HyperText Transfer Protocol) requests from the Web Browsers, analyses them as either a request for a static HTML page or for an executable program, and responds either by sending an available HTML page (e.g. held in disk storage) to the Web Browser or by invoking a program 50 to run on the Web Server system or on a different system to generate the HTML. Programs are invoked by a Web Server via the Common Gateway Interface, CGI 60, or another interface implemented by the Web Server (most Web Servers support two interfaces, one of which is the CGI).

Figure 2:
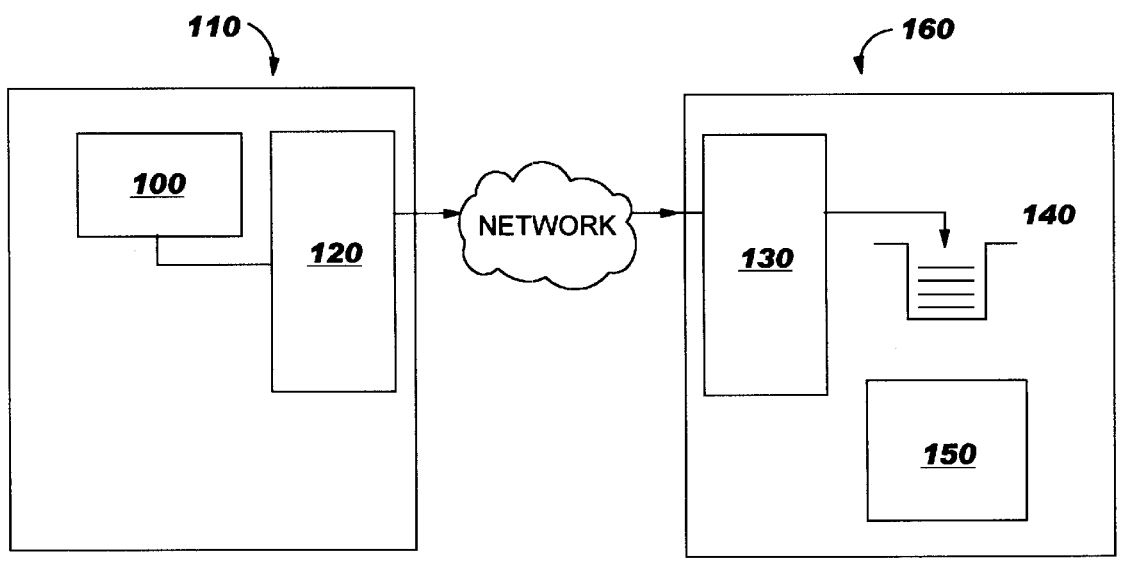
FIG. 2 is a schematic representation of inter-program communication using asynchronous messaging and queuing.

FIG. 2 is a simplified schematic representation of inter-program communication using asynchronous messaging and queuing under the control of a network of queue manager programs such as IBM's MQSeries programs. A queue manager is the system service which provides the message queuing facilities used by applications. As shown in FIG. 2, a first application program 100 on system 110 issues a command to put a message, under the control of a local queue manager program 120 and a communicating queue manager 130 running on a remote system 160, onto a queue 140. A serving application program 150 subsequently takes the message from the queue 140 when it is ready to process the message. The business application may be, for example, a banking funds transfer or an airline seat booking application. The message queues are named objects in which messages accumulate and from which they are later removed.

The maintenance of a particular queue is the responsibility of one particular queue manager. A message queue is not merely a stack: when messages are added to a queue they are added at the end, and when messages are taken from a queue they are normally removed from the front. The physical representation of the message queue depends on the environment, but can be a buffer or buffers in main storage, a file or files on disk or other permanent storage device, or both of these. The physical management of message queues is entirely the responsibility of a queue manager program, and such details are not made apparent to application programs. Applications can view a message queue simply as a 'black box' in which messages accumulate. Applications have access to message queues by using message queueing API calls to communicate with the queue manager that is installed on the same system as the application (i.e. the local queue manager).

Application programs communicate by agreeing to use particular named message queues, sending messages to the specific target queues that the application programs have agreed to read from. The locations of these queues need not be visible to the applications which send the messages; each application interacts only with its local queue manager, and it is the network of interconnected queue managers that is responsible for moving the messages to the intended queues. Each queue manager maintains local routing tables for locating the other queue managers in the network. In this way, the application-supporting message queuing software greatly simplifies the level of complexity that is required of the application programs, removing the need for them to implement their own complex communications controls.

The present invention provides access to such a network of interconnected queue managers for users who have no queue manager programs installed on their local system. The invention also provides an environment for the development of complex, reliable WWW applications which can benefit from the services of existing application-enabling middleware programs such as IBM's MQSeries products.

A link component which is implemented in software is provided for installation on a WWW Server, to issue and receive messages on behalf of synchronously connected end users. This link component, referred to as the gateway program hereafter, is invoked by requests from a Web Browser as described previously. The gateway program interfaces with the WWW Server, for example via the standard CGI (Common Gateway Interface). The gateway program enables the management of multiple concurrent users and their status, as will be described below, and manages the differences between synchronous HTTP and asynchronous messages, providing the synchronously connected Web Browser with information about the progress of the asynchronous messages that it issues on the Browser's behalf. The gateway program also manages linking between assured-delivery messaging systems and non-assured HTTP communications. Although data conversion (such as ASCII to EBCDIC) may be required since different architectures and hardware platforms have different data representations and parameters, such conversion is known in the art and is not required to be implemented by the gateway program since known messaging software products handle conversion. The gateway program is also not required to provide comprehensive security facilities, since such facilities are implemented in known messaging software and WWW Servers (such as IBM's Secure Internet Servers).

Figure 3:
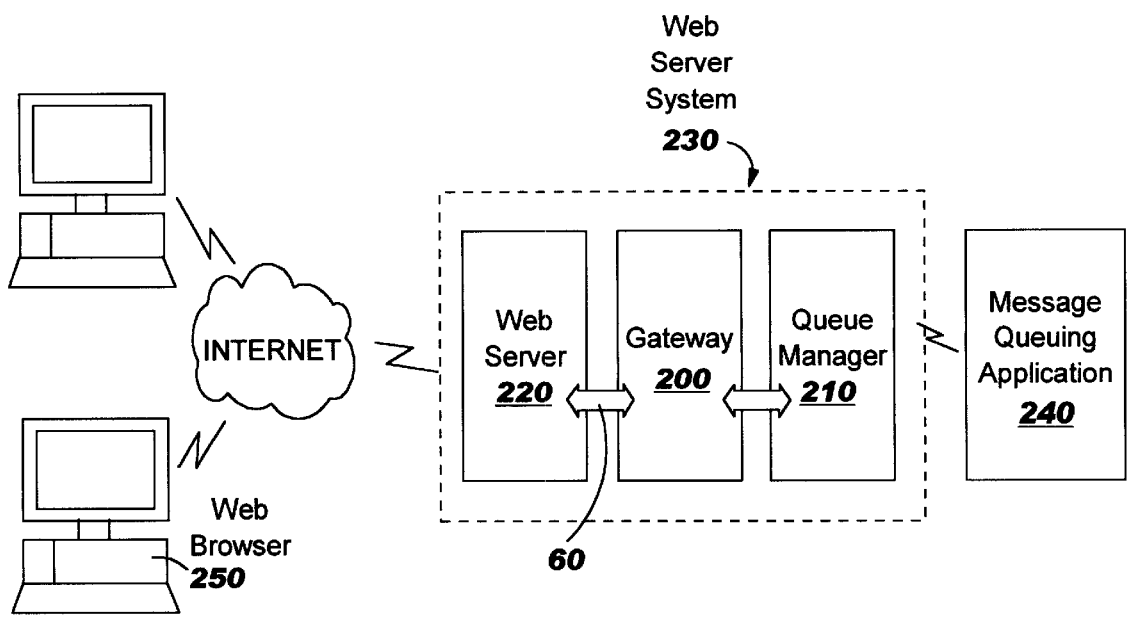
FIG. 3 shows a gateway program installed on a server system for interaction between a synchronously connected Web Browser and an application program adapted for asynchronous communication, in accordance with an embodiment of the present invention.

FIG. 3 shows a gateway program 200 interfacing between a message queue manager program 210 and a Web server program 220 installed on a computer system 230. The gateway program may be used, as shown in this example, to interface between the Web server and a message queuing application program 240 which may be running on a machine other than the server system 230. In this case, no application software is required on the server system. The system on which the message queuing application is running may be connected to the server system via the Internet, or via another communications network. The application program of this example is able to interpret HTML form data from the Web Browser 250, and to generate HTML pages in reply.

Figure 4:
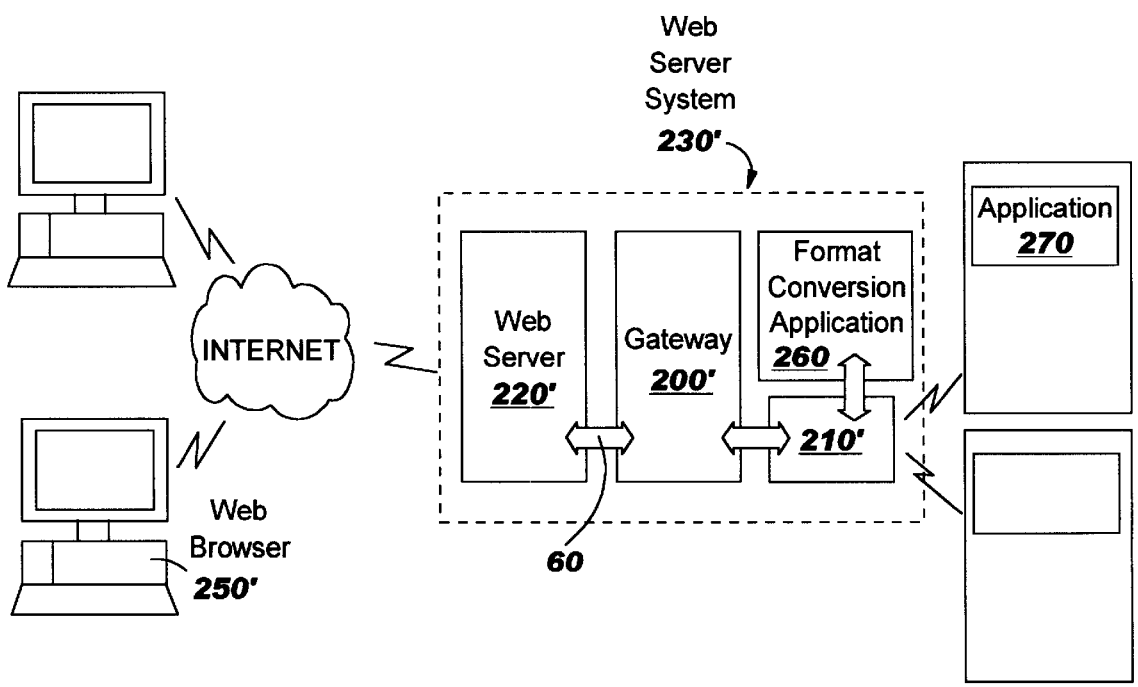
FIG. 4 shows interoperation between a gateway, Browser and application programs in accordance with a second embodiment of the invention.

A similar use of the gateway program in association with a format-conversion application component 260 installed on the Web Server system is shown in FIG. 4. The conversion component serves to convert between Web Browsers' HTML requests and replies and the internal message structure of an application program 270 which is unable to interpret HTML. This conversion component 260 thus enables a gateway program 200' according to the invention to be used with existing message queuing applications. A server component can also coordinate requests to several target applications and a reply to the Web Browser in a single unit of work. HTML conversion is well known in the art and so will not be described further here.

Figure 5:
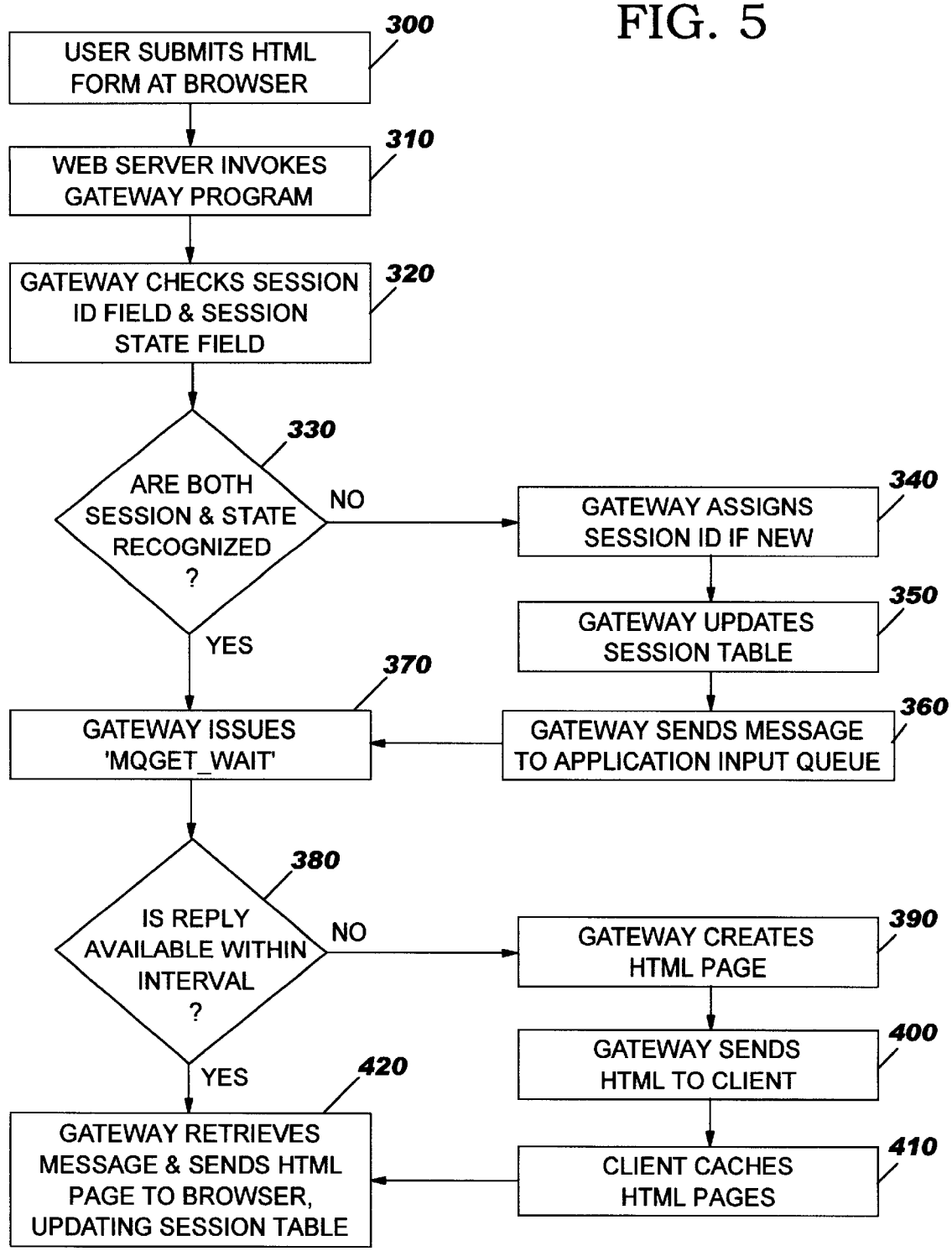
FIG. 5 is a flow diagram showing the operations performed, primarily by a gateway program at a server system, when a request is sent from a Web Browser program, according to an embodiment of the invention.

The gateway program and the communication flow between a Web Browser and an asynchronous application program will now be described with reference to FIG. 5. One or more application input queues are defined for each message queuing application program that is associated with the gateway program. This application and its input queues may be located on the Web Server machine or on any machine connected for communication with the server using the support of the message queuing middleware. The gateway has a reply queue located on the server and managed by a local queue manager program, for messages sent from the application programs.

A user interacts with the gateway program via an HTML fill-in form GET or POST request 300 that indicates the name of the message queuing application or service that they wish to use. In the preferred embodiment of the invention, the name includes the application queue name, but in an alternative embodiment this is derived from the gateway program from the application name.

An example command by which a user invokes an application is as follows:

<form method="post" action="/mig-bin/migcgi/ MQApp"> Specify a message queuing system:

<input type="input"; name="QMName"; size="48"; max length="48"> and an application:

<input type="input"; name="QName"; size="48"; max length="48">

<input type="submit"; value="Click here to start the application">

</form>

QName is required to specify the destination for the generated asynchronous message, and is normally identified with the application itself. QMName is optional. If specified it is used along with the QName to specify the destination for the message. If it is not specified then a blank name is used. Normal messaging system name resolution rules can apply. Additional fields containing application specific character format data can be included in the form request. These fields are passed to the application in the message submitted by the gateway.

The first interaction that a user has with an application program (the application 'entry point') typically comes from a static HTML Web page. The user de-references a particular URL or submits 300 an HTML form that interacts with the gateway program. The Browser's initial HTML request contains no embedded session identifier. When a user first passes through such an entry point (i.e. an HTML request is sent which does not belong to an already existing session) and initiates an application, the gateway program constructs a session 340, identified by a session identifier which is unique within the gateway, to represent the combination of the user-requested application and the instance of the request. Session identifiers can be generated with sufficient randomness or using unique server identifications to ensure that each one is unique for the whole network, but this is not essential. Existing message queue manager programs (such as IBM's MQSeries programs) have facilities for generating unique identifiers, and the gateway program of the preferred embodiment makes use of this facility.

The gateway adds 350 the session identifier information to a session table (implemented as entries on a message queue which is, for example, held in cross-processed shared memory of a server system running OS/2 or AIX operating system programs, or written to disk storage) together with client system or user identification information. OS/2 and AIX are trademarks of IBM Corporation. This table is used subsequently to associate session identifiers with user requests and application program responses, as described below. There is no provision for starting an application other than by passing through an application entry point in this manner. A user interaction can belong to no more than one session.

Having assigned a session identifier to the user's interaction, the gateway program then puts 360 a message onto the application program's defined input queue, starts 370 a timer and initiates 370 a process to receive a reply message from the application program. The receipt of replies will be described below. The message contains status information in the form of a sequence number identifying the position of this interaction within the overall communication between the requesting client process and the application program, and includes an identification of a user or client system as well as the input data submitted from the Web Browser. This data is presented to the application in the appropriate character set and code page (with conversion being performed by a process on the server system separate from the gateway program itself, as noted above). The target of a message may be a long-running message queuing application, or its arrival may be used to trigger a message queuing application to start up. As explained above, the invention may be implemented for use with applications which are 'Web aware' (that is, which are able to understand and generate HTML pages) and with applications which require HTML conversion. The following description of an embodiment of the invention relates to the example of interaction with a Web aware application.

The message queuing application should respond to the received message by sending an HTML page to the gateway program's reply queue. As described above, the gateway program has already invoked a process for taking these replies from its queue when received there. This is implemented using a known facility of the interoperating message queuing program, whereby a command to get messages from a queue can optionally include a command to wait for a specified period if the reply is not immediately available when the Get operation is first tried. In IBM's MQSeries queue manager products, this facility is invoked as an option on the Get Message API command, "MQGET_Wait", as described in the previously referenced publication "MQSeries—Message Queue Interface Technical Reference" (IBM Document number SC33-0850-01). Thus, the gateway program sends a message and issues 370 a command to retrieve the reply message, leaving the queue manager program to control the actual Get Message operation which retrieves 420 the HTML page from the reply queue and passes it to the gateway. The gateway program then transmits 420 to the Browser the HTML page containing the current session identifier as a hidden field in the HTML.

If the Wait interval of the Get Message operation expires before the reply message has been obtained by the gateway program, then Get Message returns and the gateway program reacts by sending 390,400 a preliminary reply message to the Browser. This preliminary response completes the synchronous session, but since it includes a session identifier the session may be 'restarted' later (strictly a new session is started, but since this entails interaction between the same Browser and gateway programs and references the same session identifier we can view it as a re-start of the original session). If the synchronous session between the WWW Browser and the gateway-connected WWW server program is otherwise abandoned before the reply is received, the gateway cancels any in-doubt Get Message operations. Any reply message which is placed on the gateway program's reply queue after a timeout or other abandonment of the session will remain there until such time as the WWW Browser again interacts with the gateway in search of the relevant reply message. when such a subsequent WWW Browser request is received, the gateway program will again invoke the Get Message operation (with wait interval).

Not all communications sent to a client within the session are required to include the session identifier, but the identifier is included whenever further client interaction is expected. This is generally the case when a communication is sent 400 after a timeout and before the application's reply is available, or when an application reply is received and the included session state information confirms the expectation of further client interaction. The gateway program generally updates 420 its session table with the session state information for the relevant session when a reply is received from an application program. However, if the application requires no more interaction from the user or process at the client system (as identified by session state information, or the lack thereof, within replies from the application program), then the gateway program releases 420 any session-specific resources when it passes the page to the Browser.

When the current application program 'expects' or requires further client interaction (i.e. is expecting the client to interact either with the current application program or another application program before the overall application will complete), it indicates this by means of a flag in its replies to the server. It also includes further HTML forms within the HTML page which is sent to the client, with the session identifier embedded in each of the dynamically created HTML forms.

The Web Browser has facilities for caching 410 of pages and hence is able to store the embedded session identifiers, and this makes it possible for a single user to have more than one open session. These sessions may be nested or may overlap each other. When a form which includes a session identifier is subsequently filled in 300 at the Browser, the session identifier will flow back to the gateway program at the server so that the gateway program can associate 320, 330 the subsequently-received form with the correct session. The session identifier is used to distinguish the request from other requests from other users, and other requests from the same user but for different applications. A process which is part of the gateway program scans 320 the session table for a match between a table entry and the session identifier and session state information of a received request. If the session and status information do not correspond to an existing interaction with an application, then the gateway program puts 360 the status information and input data as a message on the application input queue as described above. However, if comparing the session and state information of a received request with entries in the session table finds a match, then this must be a retry of an earlier request and so a reply may already be available. A new message should not then be sent to the application, since the relevant queue manager or managers are to be relied upon to provide assured once only delivery of the message sent previously; the gateway program invokes 370 the Get with Wait operation to check its reply queue for the expected reply message.

The assignment of a session identifier to a user interaction, which is then returned to the Browser and stored there, thus solves a number of technical problems. Firstly, it enables more than one user to access the same application or service at the same time with the gateway being able to distinguish between replies which it receives. Secondly, it ensures that sufficient context information is carried over between successive requests issued by each user to each server application for associating together a plurality of request-reply pairs of a long-running conversation of an application. Thirdly, it enables the user to interleave interactions with several different applications by providing a mechanism for distinguishing between them. Fourthly, it provides for the possibility of a user abandoning an application at any stage, possibly without giving any notification to the server or gateway program, and addresses the possibility of the link between the user and server failing.

As well as containing the session identifier, the dynamically created HTML will contain a sequence number identifying the position of the interaction within the current session. This is returned to the gateway program by the next Browser request, and the gateway program will check it 320 against the expected value. This mechanism, maintaining data and execution status context using tabulated session identifiers and sequence numbers, enables performance of sequences of client requests that are dependent on one another—the serving application is enabled to distinguish between a plurality of messages within the same session.

A session can be terminated in one of the following ways:

A server application indicates on its reply message that no further user input is requested, and the gateway responds by releasing 420 session-specific resources.

An HTML page containing a form is sent to the user, but is not filled in and returned within an administrator-defined time period. The gateway sends a termination message to the serving application that was expecting a reply from the user (avoiding unnecessary maintenance of the uncompleted serving application).

A user elects to abandon the application, through a dialogue with the gateway program, as the serving application is not responding to messages within an acceptable time. The gateway program attempts to retrieve the message that it sent. If it is unable to, it sends a cancellation message to the serving application program.

Session termination allows the gateway program and serving applications to release any session-specific resources that they have allocated. A session identifier will be rejected (i.e. will not trigger further communications other than a rejection notification) if it is sent to the gateway program, either from the user or the serving application, after the session has been terminated. Note that expiry of the server-controlled timeout period determines the period for which the client process should be kept suspended, but does not automatically terminate the session. Hence, after such a timeout, the Gateway program still maintains session identification and status information.

Message queue manager programs are known which have facilities for ensuring that messages from the gateway program will be delivered to the application input queue and that responses are returned to the gateway program (see below). However, the message queue manager programs cannot guarantee that the communications links will be functioning at a particular time or that the application itself will run to process a request from the Browser. The queue manager program also cannot provide assured delivery to a Web Browser that connects to a network of queue managers. As described, the gateway program reacts to incoming Web Browser requests by putting a message onto a server application's input queue. When the message is first placed on the queue, the gateway program starts 370 a countdown timer and waits for a reply from the server application. If the timer expires before any reply from the application program has been received, the gateway program creates 390 a page of HTML to notify 400 the user of the expiry.

Thus, the gateway program is configured to send a reply of its own to the Browser if it does not receive a reply from the application before expiry of a system-administrator-defined time period. The maximum client-suspension time period to be set will depend on the relevant application (10 seconds or 1 second may be suitable). The main purpose of this reply is to provide the user or communicating process at the client system with information to enable a determination of whether to maintain the current communication session to await a response, or to drop the session (but maintain information associated with the session) and proceed with other work items. This reply to the client may be simply a prompt to an end user (for example triggering a screen message relating to the timer expiry) but a timer-triggered reply to the Browser according to the preferred embodiment of the invention also indicates whether the request has been received by the target machine and whether the application has read the request or not. Message queue manager programs are known which provide Confirm On Arrival and Confirm On Delivery reporting. The gateway program according to the preferred embodiment is adapted to use the available reporting facilities to construct its timer-expiry notification such that the notification can include all of the available information on the progress of communication for that session.

It is within the scope of the present invention to implement the preliminary response as an immediate confirmation of receipt by the gateway of the request from the client system. This confirmation will terminate the present synchronous session, but will include the session identifier and so enable the client to revisit the interaction at a later time. Although the client process will not in this case be suspended to await a response from an asynchronously requested program, there remains the possibility of delays between the request and the confirmation of receipt due to problems with the communication links or the communicating systems themselves. A client timeout period may be used here to automate when the client request should be abandoned if no confirmation is received, but for certain applications the determination of when to abandon a client request can be left to end users to decide, as is familiar to users of existing Web Browser software.

It is also within the scope of the present invention to provide a process within the gateway program which is responsive to a received request 'type' from a client system to determine whether an immediate preliminary response is required or a set suspension or timeout period should be used with the aim of providing a full response within that period if available. According to one particular embodiment of the invention, the gateway program has a configurable timeout value which it uses by default. This value is held in a configuration file on the server system on which the gateway program is installed, and may be set when the gateway program is installed and may subsequently be modified by a system administrator. An optional parameter may be included in HTML form requests (similar to QName and QMName parameters) that overrides this default. Using examples referred to earlier, if designing an HTML form to submit a goods order which requires a quick reply confirming receipt of the request, then a small timeout value will be coded in the request form; whereas if requesting information on a bank balance where no such quick confirmation is required, then a higher value would be coded (perhaps a value corresponding to the longest wait period that users can be expected to tolerate).

Message transmission protocols for providing assured delivery of messages are described in international patent application WO 95/10805 and UK patent publication number 2311443, which are incorporated herein by reference. Although basic network support typically ensures reliable delivery of packets between machines, over an unreliable communication medium it is not usually capable of assured delivery. To guarantee that data will be sent once and once only and that communications will restart and recover properly after a major machine or network failure, more than the basic network support for packet delivery is required. In particular, both partners in an assured delivery system must remember which data has been successfully transmitted and 'hardened'. Hardening is the process of writing data to a storage medium, such as a disk, and ensuring that it is recoverable even if there is a hardware failure. Provision of resource recovery in a message queuing system is described in detail between pages 209 and 217 of the book "Messaging and Queuing Using the MQI", B. Blakeley, H. Harris & R. Lewis, McGraw-Hill, 1994.

A business application may involve several serving applications, whose activities need to be coordinated in a transactional manner. This problem is solved by the message queue manager program within the server system. The gateway program sends a message to a single controlling message queuing application program which then decomposes it into separate requests to the individual serving applications if required. These messages can be sent, and recombined under transactional control by the message queue manager program. Messaging programs having facilities providing such transactional control are known in the art (for example, IBM's MQSeries messaging programs).

The design of the gateway program allows extra serving applications to be added to cope with increased demand— i.e. the solution in accordance with the preferred embodiment of the invention is scalable. This is achieved by the gateway program including the session identifier in a message descriptor part of each of the asynchronous messages. (The message descriptor comprises information defining the properties of the message, and which is used by the message queuing service to decide how the message should be processed. The messages themselves comprise two distinct components—an application data part and a message header part containing the message descriptor information which is ancillary to the application data.) This allows several serving application programs to be run in parallel against a single work queue. If the application needs to retain context information of its own between successive interactions, it can retrieve messages which match its session identifier. If it does not maintain context information, then instances of the serving application can retrieve and process the first message that they find.

The invention according to the preferred embodiment thus facilitates linking of the Internet WWW service with a general purpose messaging system, without requiring modification of existing Web Browsers, but the invention is not limited to this implementation. The invention may be implemented to provide a link between any two data processing systems where a computer program installed on one system requires synchronous communication whereas a program on the other system requires an asynchronous form of communication. The invention according to the preferred implementation in association with messaging software such as IBM's MQSeries products also provides a bridge to networks which do not support the internet protocol (IP), since MQSeries supports TCP/IP, APPC and NetBIOS communication protocols. Thus, the invention facilitates communications between applications on IP and non-IP networks.

The preferred embodiment described above includes a separately installable gateway program in association with a messaging system. An alternative embodiment implements the gateway as an internal component of a queue manager program. The session identifier and session state table may desirably be implemented as a message queue under the control of the queue manager. The MessageID and CorelID identifiers already implemented within MQSeries queue managers may be used as suitable search information when scanning the queue. It should be noted however, that updating of entries held in a queue manager controlled queue requires the steps of removal of the entries from the queue, modification and then replacing on the queue, since there is no provision for modification of entries while they remain on a queue manager controlled queue. Updating of an entry in a table held in shared memory may entail simply overwriting the earlier entry. While there are advantages in utilising the facilities of the message queue manager program for the 'wait for event (i.e. reply) or timeout' operation, this function is typically provided by multi-threaded operating systems, and a message queue manager program may in practice be making use of the function of the underlying operating system. Alternative embodiments can use triggering of the gateway program whenever a new reply message is first placed on the reply queue, but this is not the preferred implementation since triggering is undesirable when there is no current live session with the client system. Further alternative embodiments of the invention may implement a periodic scanning of the reply queue for new reply messages instead of invoking a 'Get with Wait' operation.

In the preferred embodiment described above, session identifiers are automatically stored in cache storage of a Web Browser (as embedded fields in HTML pages). However, the session identifiers could alternatively be displayed to an end user on a display screen, and the user may be required to type in the session identifier when making a subsequent associated request. In embodiments in which a preliminary response to the client system after a timeout is merely displayed to the user with no automatic storage or automatic inclusion in future requests, it is the end user who decides whether the current session should be maintained or the session should be ended with the identifier being stored for subsequent retries of a request. The example embodiment described above also has the feature of session identifiers and session state information only being included in certain of the communications sent back to the Browser, but an alternative which is clearly within the scope of the invention involves including at least the session identifier information in all responses.

A feature of the preferred embodiment described above is the maintenance of state data by the gateway program; an alternative embodiment of the invention leaves all sequencing problems for the application programs to deal with so that the gateway program has no involvement in maintaining session state information.

What is claimed is:

1. A data communications server system for a communications network, wherein the server system has facilities for supporting synchronous communication between the server system and a client system of the network and wherein the server system also has facilities for supporting asynchronous communication with programs on the server system or on another system of the network, said server system including:

means, responsive to a ret from said client system within a synchronous communication session between the client system and the server system, for sending a request to a program on the server system or on another system of the network as an asynchronous communication;

means for starting a timer in response to said request from the client system;

means, responsive to receipt of a reply to said asynchronous communication, for associating said reply with said request form the client system to enable a reply to be sent to the client system;

means, responsive to the program's reply to the asynchronous communication including session state information which enables serialization of interactions, for including session state information with said reply sent to the client;

means for sending the reply to the client system, wherein the reply includes a session identifier and session state information which enables serialization of interactions;

means for generating a preliminary reply before receipt of a reply to said asynchronous communication, said preliminary reply including a session identifier assigned by the server system; and means for sending said preliminary reply to said client system within said synchronous communication session if a preset time period expires before a reply to said asynchronous request is received by the server system.

2. A data communications system according to claim 1, wherein said means for sending a reply to the client system is responsive to receipt of a reply to said asynchronous request before expiry of a preset time period to include information from said received reply within said reply to said client system which is sent within said synchronous session.

3. A data communications system according to claim 1, wherein said server system implements confirm on arrival (COA) and/or confirm on delivery (COD) reporting and is responsive a receipt of a COA or COD report prior to expiry of said preset time period for including said COA or COD report in said communication sent to said client system on expiry of said preset time period.

4. A data communications system according to claim 1, including means, responsive to a request from said client system, for determining whether a confirmation of receipt is to be sent to the client as a preliminary reply or said timer is to be started.

5. A data communications system according to claim 1, wherein said means for including session state information within a reply to the client system includes means for determining whether to include said session state information depending on the session state.

6. A data communications system according to claim 1, including a process at the server system for assigning a session identifier to the request from the client system and including the session identifier in the asynchronous request which it sends to a program, said server system including means, responsive to receipt from said program of a reply to said asynchronous request which reply includes said session identifier, for using said session identifier to associate the reply from said program with the request from the client system and for including said session identifier in a reply which is sent to said client system.

7. A data communications system according to claim 6, wherein said server system has Internet World Wide Web (WWW) Server software installed thereon for replying to requests from WWW Browser software installed on a client system, said server system including means for embedding session identifier information within HTML pages which are included in replies sent to a client system.

8. A data communications system according to claim 7, wherein said server system includes means, responsive to session state information included in said program's response to said asynchronous request, for including within said HTML pages one or more HTML forms for completion by an end user, said forms having said session identifier embedded therein.

9. A data communications system according to claim 7, wherein said server system includes means, responsive to session state information included in said program's reply to said asynchronous request, for embedding session state information within said HTML pages sent to the client system.

10. A data communications system according to claim 7, including means for converting HTML data of a client request into a format interpretable by said program, and for converting information included in a reply from said program into HTML for inclusion in said reply to the client system.

11. A data communications system according to claim 1, wherein said server system includes means, responsive to an identification of the session state being included in said program's reply to said asynchronous request, for determining whether to include session identification information within said reply to the client system.

12. A data communications client system for a communications network, the client system including:

means for sending a request, within a particular synchronous communication session, to a server system of the network;

means for receiving a reply from said server system;

means, responsive to a received reply, for storing session identifier information assigned by a process at said server system and included in said reply and for storing session state information which is included in said reply to enable serialization of interactions;

means for determining, in dependence on said session state information included in a response from a server system, whether to store said session identifier and session state information at the client system; and means for retrieving said stored information for use in a subsequent interaction with said server system.

13. A system according to claim 12, wherein said means for retrieving includes:

means for comparing input information for a client request with stored information of received replies, prior to sending said client request; and means, responsive to determining a match between the input information and the stored information, for retrieving said stored information and including said stored session identifier information and information relating to stored session state information within the client request.

14. A system according to claim 12, including means for starting a timer when said session state information is stored at the client system and means for deleting said session state information on expiry of said timer.

15. A method of data communication between a first computer program at a first system of a communication network and a third computer program which is accessible via a second system of the network, including the steps of:

responsive to receipt by said second system of a request from said first program within a synchronous communication session, sending a request to the third program as an asynchronous communication, said asynchronous request including a session identifier assigned by a second program at the second system and session state information which enables serialization of interactions;

on receipt by said second system of a reply to said asynchronous communication, associating said reply with said request from the first program using said session identifier, to enable a reply to be sent to the first program, and responsive to the reply to said asynchronous communication including session state information which enables serialization of interactions, triggering the inclusion of the session identifier and the session state information which enables serialization of interactions within the reply to be sent to the first program.

16. A method of data communication between a first computer program at a first system of a communication network and a third computer program which is accessible via a second computer program at a second system of the network, including the steps of:

sending a first request from the first program to the second system within a synchronous communication session;

responsive to receipt by said second system of the first request from said first program, sending a request to the third program as an asynchronous communication, said asynchronous request including a session identifier assigned by a second program at the second system and session state information which enables serialization of interactions, and starting a timer;

on receipt by said second system of a reply to said asynchronous communication, associating said reply with said request from the first program using said session identifier, to enable a reply to be sent to the first program, and responsive to the reply to said asynchronous communication including session state information which enables serialization of interactions, determining whether to include session identifier information and session state information which enables serialization of interactions within the reply to the first program depending on the session state; and sending a reply to said first program within said synchronous communication session, wherein said reply to said first program comprises:
  a preliminary reply including said session identifier if a preset time period expires before a reply to said asynchronous communication is received; and
  a reply including said session identifier and said session state information which enables serialization of interactions if the reply to the asynchronous communication is received by said second system before said preset time period expires and if said determination is positive.

17. A method of data communication between a first computer program at a first system of a communication network and a third computer program which is accessible via a second system of the network, including the steps of:

responsive to receipt by said second system of a request from said first program within a synchronous communication session, sending a request to the third program as an asynchronous communication, said asynchronous request including a session identifier assigned by a second program at the second system and session state information which enables serialization of interactions;

on receipt by said second system of a reply to said asynchronous communication, associating said reply with said request from the first program using said session identifier, to enable a reply to be sent to the first program, and responsive to the reply to said asynchronous communication including session said state information which enables serialization of interactions, determining whether to include said session identifier and the session state information which enables serialization of interactions within the reply to the first program.

18. A method of data communication between a first computer program at a first system of a communication network and a third computer program which is accessible via a second system of the network, including the steps of:

responsive to receipt by said second system of a request from said first program within a synchronous communication session, sending a request to the third program as an asynchronous communication, said asynchronous request including a session identifier assigned by a second program at the second system and session state information which enables serialization of interactions;

on receipt by said second system of a reply to said asynchronous communication, associating said reply with said request from the first program using said session identifier, to enable a reply to be sent to the first program, and responsive to the reply to said asynchronous communication including session state information which enables serialization of interactions, determining whether to include said session identifier and the session state information which enables serialization of interactions within the reply to the first program depending on the session state.

* * * * *

UNITED STATES PATENT AND TRADEMARK OFFICE
CERTIFICATE OF CORRECTION

PATENT NO.      : 6,336,135 B1
DATED           : January 1, 2002
INVENTOR(S)     : P. Niblett et al.

It is certified that error appears in the above-identified patent and that said Letters Patent is hereby corrected as shown below:

Column 18,
Line 48, after "a" delete "ret" and insert -- request --.
Line 58, after "request" delete "form" and insert -- from --.
Line 63, after "information" delete "with" and insert -- within --.

Signed and Sealed this

Twenty-fourth Day of September, 2002

*Attest:*

*Attesting Officer*

JAMES E. ROGAN
*Director of the United States Patent and Trademark Office*